UNITED STATES PATENT OFFICE.

HIRAM L. WILCOX, OF LINCOLN, NEBRASKA.

COMPOUND FOR TANNING.

SPECIFICATION forming part of Letters Patent No. 353,341, dated November 30, 1886.

Application filed August 26, 1885. Serial No. 175,380. (No specimens.)

*To all whom it may concern:*

Be it known that I, HIRAM L. WILCOX, a resident of Lincoln, in the county of Lancaster and State of Nebraska, have invented a new Improvement in Compounds for Tanning and for other Purposes; and I do hereby declare that the following is a full, clear, and exact description thereof, which will enable others skilled in the art to make and use the same.

In the manufacture of the extract of polygonum for tanning and other purposes the same is sometimes liable to fermentation, on account of the saccharine matter contained therein, and the object of my invention is to prevent this fermentation and the consequent deterioration of the extract as a commercial article, either in transportation or storage.

My invention consists of a compound or mixture of the extract of polygonum with the extract of *Rhus glabrum,* as follows: In preparing my new compound, take of the plant *Polygonum amphibium* or *angusticum,* say, two parts, and take of the green leaves or branches of the shrub *Rhus glabrum,* one part, and make an extract of the two substances by any convenient process. In this mixed extract the large quantity of gallic acid in the *Rhus glabrum* prevents the fermentation of the saccharine matter of the extract of polygonum, and thus affords a superior article of manufacture or commerce.

This new extract may be used not only for tanning, which is the chief purpose, but also for dyeing, medicine, and other purposes.

Having described my invention, what I claim, and desire to secure by Letters Patent, is—

As a new article of commerce and manufacture, the described compound of the extract of polygonum and extract of *Rhus glabrum,* substantially as and for the purposes set forth.

In testimony that I claim the above-described new compound as my invention I have hereunto set my hand in the presence of two witnesses.

HIRAM L. WILCOX.

Witnesses:
HENRY E. LEWIS,
ISAAC WHITED.